(12) United States Patent
Bredahl et al.

(10) Patent No.: US 11,295,266 B1
(45) Date of Patent: Apr. 5, 2022

(54) AUTOMATED MANAGEMENT OF A SHIPPING SYSTEM

(71) Applicant: United States Fire Insurance Company, Morristown, NJ (US)

(72) Inventors: Thomas C. Bredahl, Darien, CT (US); Kenneth Russo, Iselin, NJ (US); Thomas Kuriakose, Glen Allen, VA (US); Luigi Pedalino, Cedar Knolls, NJ (US); Matthew Gauthier, Pingree Grove, IL (US); Jeffrey Norman Roth, Mountain Lakes, NJ (US)

(73) Assignee: United States Fire Insurance Company, Morristown, NJ (US)

( * ) Notice: Subject to any disclaimer, the term of this patent is extended or adjusted under 35 U.S.C. 154(b) by 0 days.

(21) Appl. No.: 17/098,289

(22) Filed: Nov. 13, 2020

Related U.S. Application Data

(60) Provisional application No. 62/935,768, filed on Nov. 15, 2019.

(51) Int. Cl.
  *G06Q 10/08* (2012.01)
  *G06Q 50/30* (2012.01)
  *G06Q 10/04* (2012.01)

(52) U.S. Cl.
  CPC ......... *G06Q 10/0838* (2013.01); *G06Q 10/04* (2013.01); *G06Q 50/30* (2013.01)

(58) Field of Classification Search
  CPC ..... G06Q 10/0838; G06Q 10/04; G06Q 50/30
  USPC ......................................................... 705/330
  See application file for complete search history.

(56) References Cited

U.S. PATENT DOCUMENTS

| 2002/0087371 A1* | 7/2002 | Abendroth | G06Q 10/02 705/37 |
| 2005/0187811 A1* | 8/2005 | Freeman | G06Q 10/06315 705/7.25 |

OTHER PUBLICATIONS

"Estimation of traffic density from drone-based delivery in very low level urban airspace" by Doole et al. (Year: 2020).*

* cited by examiner

*Primary Examiner* — Zeina Elchanti
(74) *Attorney, Agent, or Firm* — Locke Lord LLP; Christopher J. Capelli; Judy R. Naamat

(57) ABSTRACT

A method/system is provided for automatically managing a shipping system, including receiving trip information for a plurality of trips requested by at least one shipper and receiving get-load requests associated with a plurality of carriers to participate in an assignment process to be assigned to execute one or more of the trips. The method further includes tentatively assigning a carrier identified by a get-load request to a trip, triggering a determination whether an EL requirement for the trip is satisfied by an amount of original EL indicated for the carrier, and if not satisfied, requesting adequate immediate digital provision of EL trip coverage for the carrier, only assigning the carrier to the trip after receiving confirmation that the EL trip coverage can be immediately and digitally obtained, and otherwise blocking the get-load request associated with the carrier from participating in an assignment process to be assigned to the trip and/or other equivalent trips.

16 Claims, 10 Drawing Sheets

| | A | B | C | D | E | F | G | H | I | J |
|---|---|---|---|---|---|---|---|---|---|---|
| | LOGO | | Origin City | Origin State | Origin Zip | Destination City | Destination State | Destination Zip | Price | Buy? |
| | Version 1.0 | SAMPLE | Memphis | TN | 38103 | Germantown | TN | 38139 | $46.61 | FALSE |
| | A. USERNAME AND PASSWORD | 1 | Memphis | TN | 38103 | Germantown | TN | 38139 | | |
| | USERNAME: | 2 | Memphis | TN | 38103 | Germantown | TN | 38139 | | |
| | User.Name@website.com | 3 | Memphis | TN | 38103 | Germantown | TN | 38139 | | |
| | PASSWORD: | 4 | Memphis | TN | 38103 | Germantown | TN | 38139 | | |
| | \*\*\*\* \*\*\*\* \*\*\*\* | 5 | Memphis | TN | 38103 | Germantown | TN | 38139 | | |
| | | 6 | | | | | | | | |
| | Login | 7 | Memphis | TN | 38103 | Germantown | TN | 38139 | | |
| | B. FOLLOW THE STEPS BELOW (IN ORDER) | 8 | Brooklyn | NY | 11201 | Morristown | NJ | 07960 | | |
| | 1. Following the example provided, fill in the your trip information on the right. | 9 | Brooklyn | NY | 11201 | Morristown | NJ | 07960 | | |
| | | 10 | Memphis | TN | 38103 | Germantown | TN | 38139 | | |
| | 2. Confirm Trip(s) | 11 | Brooklyn | NY | 11201 | Morristown | NJ | 07960 | | |

| | A | B | C |
|---|---|---|---|
| 1 | LOGO | | |
| 2 | | | |
| 3 | Version 1.0 | SAMPLE | Origin City |
| 4 | A. USERNAME AND PASSWORD | | |
| 5 | USERNAME: | | 1 Memphis |
| 6 | User.Name@wesbsite.com | | 2 Memphis |
| 7 | PASSWORD: | | 3 Memphis |
| 8 | *** *** *** | | 4 Memphis |
| 9 | Login | | 5 Memphis |
| 10 | B. FOLLOW THE STEPS BELOW (IN ORDER) | | 6 Brooklyn |
| 11 | 1. Following the example provided, fill in the your trip information on the right. | | 7 Memphis |
| 12 | | | 8 Memphis |
| 13 | 2. Confirm Trip(s) | | 9 Brooklyn |
| 14 | | | 10 Brooklyn |
| 15 | 3. Check the boxes with the checkbox you used to buy or Select All below | | 11 |
| 16 | | | 12 |
| 17 | Select All | | 13 |
| 18 | | | 14 |
| | | | 15 |

| | G | H | I | J | K |
|---|---|---|---|---|---|
| | Dest. ST. | Dest. Zip | Price | Buy? | Indication Request ID |
| SAMPLE | TN | 38139 | $46.61 | FALSE | 1587 |
| 1 | TN | 38139 | $51.79 | ☑ | 18512 |
| 2 | TN | 38139 | $51.79 | ☑ | 18513 |
| 3 | TN | 38139 | $51.79 | ☑ | 18514 |
| 4 | TN | 38139 | $51.79 | ☑ | 18515 |
| 5 | NJ | 07960 | $51.79 | ☑ | 18516 |
| 6 | TN | 38139 | $51.79 | ☑ | 18517 |
| 7 | TN | 38139 | $51.79 | ☑ | 18518 |
| 8 | NJ | 07960 | $51.79 | ☑ | 18519 |
| 9 | UTX | 84601234234234 | | ☑ | 18520 |

| | A | B | J | K | L | M | N | O | P | Q |
|---|---|---|---|---|---|---|---|---|---|---|
| 1 | LOGO | Origin | Buy? | Induct. Req. I | DOT. NO. | Pick-Up Trip Date | Delivery Trip Date | BOL Number | Shipper Name | Consignee Name |
| 2 | | SAMPLE | FALSE | 1587 | 44 | 05/17/2019 | 05/18/2019 | 123456 | Homer Simpson | Bart Simpson |
| 3 | Version 1.0 | 1 | | 18512 | 44 | 10/13/2019 | 10/13/2019 | 12344 | shipperName | consigneeName |
| 4 | A. USERNAME AND PASSWORD | 2 | | 18513 | 44 | 10/13/2019 | 10/13/2019 | 12345 | shipperName | consigneeName |
| 5 | USERNAME: | 3 | | 18514 | | | | | | |
| 6 | User.Name@website.com | 4 | | 18515 | | | | | | |
| 7 | PASSWORD: | 5 | | 18516 | 44 | 10/13/2019 | 10/13/2019 | 12346.5 | shipperName | consigneeName |
| 8 | **-*-**** | 6 | | | | | | | | |
| 9 | Login | 7 | | 18517 | | | | | | |
| 10 | B. FOLLOW THE STEPS BELOW (IN ORDER) | 8 | | 18518 | | | | | | |
| 11 | 1. Following the example provided, fill in the your trip information on the right. | 9 | | 18519 | 44 | 10/13/2019 | 10/13/2019 | 12348.3 | shipperName | consigneeName |
| 12 | 2. Confirm Trip(s) | 10 | | 18520 | 44 | 10/13/2019 | 10/13/2019 | 12348.9 | shipperName | consigneeName |
| 13 | | 11 | | | | | | | | |
| 14 | | 12 | | | | | | | | |
| 15 | 3. Click the boxes with the checkbox you used to buy or Select All below | 13 | | | | | | | | |
| 16 | Select All | 14 | | | | | | | | |
| 17 | | 15 | | | | | | | | |
| 18 | | 16 | | | | | | | | |
| 19 | 4. Fill in the remaining info (Columns L-O) or the trips you want to buy | 17 | | | | | | | | |
| 20 | | 18 | | | | | | | | |
| 21 | 3. Buy Selected Trip(s) | 19 | | | | | | | | |
| 22 | | | | | | | | | | |

AUTOMATED MANAGEMENT OF A SHIPPING SYSTEM

CROSS REFERENCE TO RELATED APPLICATIONS

This application claims priority to U.S. Patent Application Ser. No. 62/935,768 filed Nov. 15, 2019, which is incorporated herein by reference in its entirety.

FIELD OF THE DISCLOSURE

The disclosed embodiments generally relate to automated management of a shipping system, and more particularly, to a system for automated management of a shipping system in conjunction with immediate and digitally provision of trip-specific excess liability coverage.

BACKGROUND OF THE DISCLOSURE

The shipping industry has been disrupted by for-hire commercial common carriers that can work independently, such as by using a shipping system that matches for-hire carriers (referred to as carriers) to loads, each load needing to be shipped per a request of a shipper. Shipping systems can include, for example, freight brokers, freight forwarders, systems employing third-party logistics, etc.

A carrier typically needs two types of insurance coverage for transporting loads. First, the carrier needs primary commercial insurance coverage to comply with compulsory requirements mandated by motor vehicle laws of the respective states in the United States. Second, the carrier needs excess liability insurance coverage that provides an additional limit of liability above the limit of liability provided by the carrier's primary commercial insurance coverage. The excess liability insurance coverage serves two main purposes for the carrier. First, in the event legal action is taken against them because of losses arising out of an automobile accident, the excess liability insurance coverage protects the carrier's assets by providing legal representation and financial ability to satisfy claims and judgments, at least up to the excess liability insurance coverage policy limit. Second, the excess liability insurance coverage satisfies contractual insurance requirements imposed by a shipper of the goods that the carrier is hauling.

The excess liability insurance marketplace reacted to market and regulatory changes by either withdrawing from the excess liability insurance coverage market or increasing annual premium rates and reducing insurance capacity. For-hire carriers were faced with the options of purchasing lower limits of liability at a greater cost or not purchasing excess insurance coverage at all. Following a delay, the primary liability insurance marketplace followed suit. The combined increased cost of purchasing annual policies for both types of insurance was prohibitive in many cases, impacting for-hire carriers of all fleet sizes, with a disproportional impact on smaller fleet carriers.

With an increase in online consumerism and on-demand delivery services, freight demands have been greatly increasing in the U.S., bringing an increased need for freight carriers. At the same time, the number of trucks or available trucking capacity to move such freight has had a tendency to shrink due, in part, to a diminishing labor pool of truckers, escalating operational costs, and ever more stringent safety regulations around trucker hours of service and use of electronic logs. Despite the Federal Motor Safety Administration not increasing the liability insurance minimums for motor carriers since 1985, more and more shippers and third party logistics companies have found required liability limits to be inadequate and have decided to impose higher liability limit requirements. A shipper may require a higher excess liability limit for a particular load. Furthermore, each state can have different regulations governing required excess liability limits. Some carriers, particular smaller fleet carriers, may be unable to purchase annual policies that meet the required excess liability limits, impeding those carriers from executing trips for which excess liability limit requirements are increased.

Shipping systems are now available that include, for example, cloud-based services, freight brokers, third-party logistics, and freight forwarders. Shipping systems can match loads that shippers need to have shipped to carriers that can execute the shipping. A match can be assigned by a shipping system very quickly. On the other hand, the process of obtaining annual excess liability insurance is a slow process that is disjointed from the matching process.

A carrier can be executing a trip to transport a load across a number of states. If the carrier does not have annual excess liability limit that meets the requirements of one of those states, the carrier has two choices—the carrier can either stop and purchase an annual policy of excess liability coverage to meet the state's required limit, or circumvent the state. A load can include perishable goods, or delivery of the load can be time sensitive. Any delay caused by circumvention or waiting for business hours to purchase an annual policy can cause damage to the goods or foil the purpose of a trip.

Some trips involve greater risk than others do. Annual provision of excess liability coverage does not account for variation in risk of the various trips as they occur. At best, excess liability coverage limits and the associated terms are determined by applying a statistical operation to a history of trips, with updates to the excess liability coverage performed at long intervals, namely yearly.

Some truckers of some carriers and carriers themselves incur greater risk than others. Annual provision of excess liability coverage does not account for recent trucker behavior. Even if telematics data were to be used to track trucker behavior and/or carrier condition for the purpose of determination of excess liability coverage limits and associated terms, there would be a lag in the time of occurrence of an event reflected in the tracked data and an adjustment to the excess liability coverage limits and associated terms. Due to human nature, the lag in time can negate an incentive to change driving or vehicle maintenance behavior.

Conventional methods and systems for providing shipping systems that match carriers to loads have generally been considered satisfactory for their intended purpose. Also, conventional methods and systems for tracking trucker behavior and/or carrier condition and provision of annual excess liability coverage has been considered satisfactory for their intended purpose. However, there is still a need in the art to provide a shipping system that can coordinate matching carriers to loads and management of excess liability coverage. There is also a need in the art to apply data obtained by telematics more effectively with respect to determination of excess liability coverage limits and associated terms.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a manager system includes for automatically managing a shipping system, the manager system includes a memory configured to store a plurality of programmable instructions and a processing device in communication with the memory. The programmable instructions, when executed by the processing device, cause the processing device to receive trip information for a plurality of trips requested by at least one shipper and receive get-load requests associated with a plurality of carriers to participate in an assignment process to be assigned to a trip of the plurality of trips for executing the trip. The trip information includes an excess liability (EL) trip requirement for the trip and a source/destination location pair for transport of the load. Each get-load request identifies its associated carrier and indicates an amount of original EL already associated with the carrier. The programmable instructions, when executed by the processing device, further cause the processing device to tentatively assign a carrier identified by one of the get-load requests to a trip of the plurality of trips, in response to the tentative assignment, determine whether the EL requirement for the trip is satisfied by the amount of original EL indicated for the carrier, and in response to a determination that the EL requirement for the trip is not satisfied, submit an EL trip request. The EL trip request includes identification of the carrier, trip information for the trip, and requests immediate digital provision of EL trip coverage for the carrier in association with the trip that satisfies the trip's EL trip requirement. The programmable instructions, when executed by the processing device, further cause the processing device to only assign the carrier to the trip after receiving confirmation that the EL trip coverage can be immediately and digitally obtained, and, in response to failure to receive the confirmation that the EL trip coverage can immediately and digitally be obtained, block the get-load request associated with the carrier from participating in an assignment process to be assigned to the trip and/or other equivalent trips of the plurality of trips.

In one or more embodiments, the programmable instructions when executed by the processing device, can further cause the processing device to obtain the confirmation that the EL trip coverage can immediately and digitally be obtained.

In one or more embodiments, the programmable instructions when executed by the processing device, further can cause the processing device to receive identification of a regulatory certification associated with the carrier and identification of a bill of lading associated with the trip, wherein the confirmation that the EL trip coverage can immediately and digitally be obtained is based on receipt of the regulatory certificate and the EL trip coverage is based on the bill of lading.

In one or more embodiments, the confirmation that the EL trip coverage can immediately and digitally be obtained can be based on first terms for obtaining the EL trip coverage, wherein the programmable instructions when executed by the processing device further cause the processing device to receive a second confirmation that EL trip coverage can immediately and digitally be obtained in association with the carrier and a second trip based on second terms that were adjusted relative to the first terms as a function of actual or predicted trip execution data about execution of the trip, wherein the second trip is one of the trip causing the trip, a future trip, or a previous trip.

In one or more embodiments, the actual or predicted trip execution data can include telemetric data, comparison results of the logged or streamed telemetric data relative to traffic rules or laws, geolocation of a predicted or actual route of the trip, indications of driving behavior, and/or weather data describing predicted or actual weather associated with the trip.

In one or more embodiments, the programmable instructions when executed by the processing device, can further cause the processing device to receive notification of the second terms before, during, or after the second trip.

In another aspect of the disclosure, a trip EL server is provided. The trip EL server includes a memory configured to store a plurality of programmable instructions and a processing device in communication with the memory, wherein the programmable instructions when executed by the processing device, cause the processing device to receive an EL trip request from a manager system of a shipping system, wherein the EL trip request, which is triggered in response to receipt of a get-load request from a carrier tentatively assigned to a trip by the manager system, requests immediate digital provision of EL trip coverage for the carrier in association with the trip that satisfies the trip's EL trip requirement. The get-load request requests assignment to a plurality of trips. The EL request includes identification of the carrier and includes trip information for the trip. The trip information includes an EL trip requirement for the trip and a source/destination location pair for transport of the load. The programmable instructions when executed by the processing device, cause the processing device to determine first terms of the EL trip coverage based on the trip information in view of an amount of original EL already associated with the carrier and provide confirmation to the manager system of the shipping system that the determined EL trip coverage can be immediately and digitally provided for the trip in accordance with the first terms, wherein assignment of the carrier to the trip is contingent on the confirmation that the EL trip coverage can be immediately and digitally provided for the trip, and the get-load request is otherwise blocked.

In one or more embodiments, provision of the confirmation can be dependent on receiving identification of a regulatory certificate associated with the carrier and identification of a bill of lading and the EL trip coverage is based on the bill of lading.

In one or more embodiments, the programmable instructions when executed by the processing device, can further cause the processing device to receive actual or predicted trip execution data about execution of the trip, adjust second terms relative to the first terms as a function of the trip execution data, apply the second terms to a second confirmation that the determined EL trip coverage can be immediately and digitally provided for a second trip, the second trip being the trip, a past trip or a future trip, and provide, in association with the second trip, the second confirmation to the manager system.

In one or more embodiments, the actual or predicted execution data can include logged or streamed telemetric data, comparison results of the logged or streamed telemetric data relative to traffic rules or laws, geolocation of a predicted or actual route of the trip, indications of driving behavior, and/or weather data describing predicted or actual weather associated with the trip.

In one or more embodiments, the programmable instructions when executed by the processing device, can further cause the processing device to transmit notification of the second terms before, during, or after the second trip.

In a further aspect of the disclosure, a computing device is provided. The computing device includes a memory configured to store a plurality of programmable instructions and a processing device in communication with the memory, wherein the programmable instructions when executed by the processing device, cause the processing device to submit a get-load request to a manager system of a shipping system to participate in an assignment process managed by the manager system, wherein the get-load request requests assignment to a trip of a plurality of trips for execution of the trip by a carrier associated with the get-load request, identifies the carrier, and indicates an amount of original EL already associated with the carrier. The programmable instructions, when executed by the processing device, further cause the processing device to wait for notification of an assignment by the manager system of the carrier to a trip of the plurality of trips and receive the notification of the assignment after the manager system immediately and digitally obtains the EL trip coverage. The trip is only tentatively assigned by the manager system when the amount of original EL indicated in the get-load request does not satisfy an EL requirement for the trip, and the notification of assignment is only provided by the manager server after submitting an EL trip request to an EL server in response to the get-load request. The EL trip request identifies the carrier and a source/destination location pair for transport of a load for the trip and further requests immediate digital provision of EL trip coverage for the carrier in association with the trip that satisfies the trip's EL trip requirement. The get-load request is blocked from further participation in the assignment process for assignment to the trip and/or other equivalent trips of the plurality of trips in response to failure to immediately and digitally obtain the EL trip coverage from the EL server.

In one or more embodiments, the programmable instructions, when executed by the processing device, can further cause the processing device to digitally and immediately obtain the EL trip coverage from the EL server and/or the manager system.

In one or more embodiments, the EL trip request can further include providing identification of a regulatory certificate associated with the carrier and identification of a bill of lading associated with the trip, wherein immediately and digitally obtaining the EL trip coverage can be based on provision of the regulatory certificate and the EL trip coverage is based on the bill of lading.

In one or more embodiments, immediately and digitally obtaining the EL trip coverage can be based on first terms, wherein actual or predicted trip execution data about execution of the trip can be provided to the EL server, which can cause the EL server to adjust second terms relative to the first terms as a function of the trip information and apply the second terms to immediate and digital provision of EL trip coverage for a second trip, the second trip being the trip, a past trip or a future trip. The programmable instructions, when executed by the processing device, can further cause the processing device to receive, notification of the second terms.

In one or more embodiments, the actual or predicted execution data can include logged or streamed telemetric data, comparison results of the logged or streamed telemetric data relative to traffic rules or laws, geolocation of a predicted or actual route of the trip, indications of driving behavior, and/or weather data describing predicted or actual weather associated with the trip.

In one or more embodiments, the notification of the second terms can be received before, during, or after the second trip.

BRIEF DESCRIPTION OF THE DRAWINGS

The accompanying appendices and/or drawings illustrate various non-limiting, example, inventive aspects in accordance with the present disclosure:

FIGS. 4-7 show example screenshots provided by an application programmable interface for obtaining EL trip coverage for trips in bulk, in accordance with an aspect of the disclosure.

DETAILED DESCRIPTION OF CERTAIN EMBODIMENTS

Figure 1:
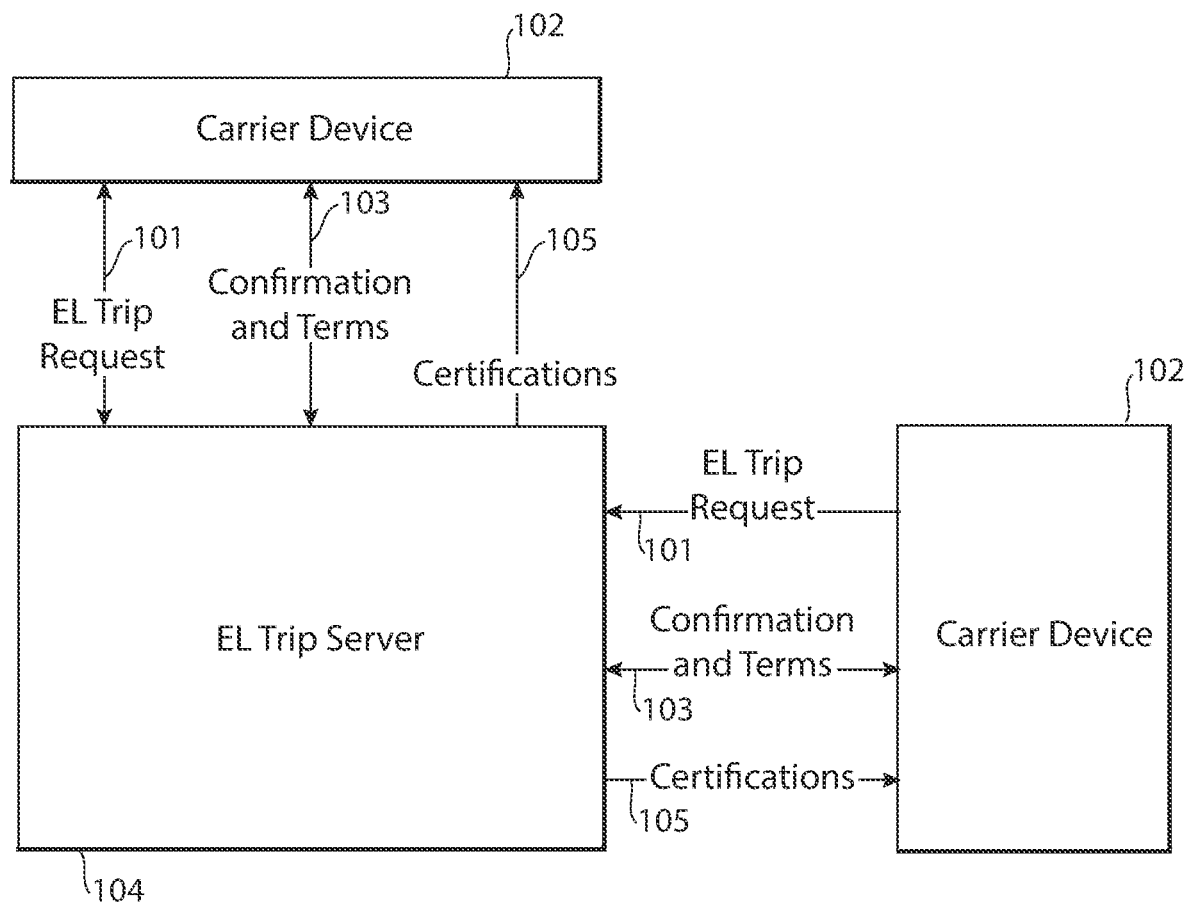
FIG. 1 illustrates a block flow diagram of an example transportation support system, in accordance with an aspect of the disclosure.

Reference will now be made to the drawings wherein like reference numerals identify similar structural features or aspects of the subject disclosure. For purposes of explanation and illustration, and not limitation, a block flow diagram of an exemplary embodiment of a transportation support system in accordance with the disclosure is shown in FIG. 1 and is designated generally by reference character 100. Other embodiments of the transportation support system 100 in accordance with the disclosure, or aspects thereof, are provided in FIGS. 2-8, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, the transportation support system 100 is provided, including one nor more carrier devices 102 and an excess liability (EL) server 104. Carrier device 102 includes a computer system, such as a desktop, laptop, tablet, smartphone computer system, on-board vehicle computer system, etc. associated with a carrier, such as trucks or other vehicles that transport loads. The carrier can be a carrier fleet, such as a company that manages or owns multiple trucks. EL trip server 104 is a server or other computing device that provides online services to carrier devices 102 to receive and manage El trip requests for EL trip coverage and determinations related to provision of the EL trip coverage, and provide confirmation that EL coverage can be provided digitally and immediately for a specific trip, such as based on a pick-up location and delivery location of the trip and identification of a bill of lading (BOL) for the trip.

Shippers are entities that need loads transported from a pick-up location to a delivery location. Carriers, as motor vehicles and as transporters of goods, must fulfill insurance coverage requirements imposed by motor vehicle rules as well as any additional contractual requirements imposed by shippers or third parties, such as third party logistic companies or freight forwarders. Insurance coverage can include primary commercial insurance coverage and excess liability coverage. In addition to fulfilling the contractual obligation imposed by the shipper or a third party, excess liability coverage provides coverage for legal representation and satisfaction of claims and judgments in the event legal action is taken against a carrier due to losses arising out of an automobile accident. Each load may have a different contractual requirement for excess liability coverage imposed by the shipper or a third party.

EL trip server 104 is configured to receive EL trip requests that request EL coverage for a particular trip, meaning for a load to be transported from a pick-up location to a delivery location as contracted by a shipper. EL trip coverage can be obtained per trip, allowing carriers to avoid the need to maintain annual insurance coverages that can be costly, and allows flexibility to meet different requirements for different trips as required by shippers or a third party. The ability to immediately and digitally obtain EL trip coverage via EL trip server 104 for a specific trip, on demand, can enable independent carriers and small carrier fleets to compete with larger fleets for the opportunity to transport loads.

On demand refers to the ability for a carrier device 102 associated with a validated carrier to submit an EL trip request at any time from any valid location for a particular trip, such as a trip represented by a pick-up location, a delivery location and an excess liability limit requested for the trip. Upon receipt of an EL trip request, EL trip server 104 can immediately and digitally submit, substantially instantaneously, confirmation that the EL trip coverage can be provided with a quote regarding terms (e.g., premium, limit, verification check requirements, reasonability check requirements, and/or restrictions, etc.) of the EL trip coverage, bind the EL trip coverage, and deliver a certificate of EL trip coverage tied to a unique identifier for the trip (e.g., identification of a bill of lading (BOL)), including performance of any related transactions.

A carrier can request and obtain EL trip coverage even while enroute, such as when entering a state that requires a higher EL limit than the coverage that covers the carrier. A carrier may not have the required EL trip coverage for a trip, but can still compete for assignment of the trip to the carrier based on an ability to obtain from EL trip server 104 confirmation that the EL trip coverage can be or is immediately and digitally obtained for the trip.

In addition, real-time data about trip-related factors can be applied when determining terms of the EL trip coverage before providing the quote. The real-time data can include, for example information about the trip and/or trucker (driver of a truck or other freight carrier or an autonomously driven truck, also referred to as a driver), telematics for the trip or a recent trip, regulatory (e.g., U.S. or state Department of Transportation (DOT)) information, or geolocation related factors (e.g., weather and/or traffic alerts).

Carrier device 102 can use a website or an application supported by EL trip server 104 to submit one or more EL trip requests to EL trip server 104, receive confirmation that the EL trip coverage can be immediate and digitally delivered (such as with a quote for terms), agree to the terms (such as with a transaction), and receive a certificate of coverage for each trip.

Carrier device 102 can use an application program interface (API) to enable bulk purchase for multiple carriers assigned to different, respective trips. The API can provide a spreadsheet that provides the ability to confirm and obtain coverage for multiple trips. The API can further be integrated with shipping systems, such freight brokers, freight forwarders, and/or system employing third-party logistics. Transactions can use bordereau insurance premium billing for both direct and online billing.

Regarding arrangement of the EL trip coverage, the EL trip server 104 can accept EL trip requests and confirm immediate and digital confirmation and/or certificates for EL trip coverage based on a number of pre-established conditions. A wholesale insurance broker (WIB) is procured from an insurer master insurance policy (master policy) on behalf of a risk purchasing group (RPG). The RPG is named on the policy. EL trip server 104 is hosted on behalf of the WIB. Based on pre-established agreements between the insurer and the WIB, and between the WIB and a retail insurance broker (RIB), EL trip server 104 can receive an EL trip request for a trip. Based on agreements (which can be formed prior to or at the time of submitting the EL trip request) between the carrier and its qualifying truckers with a RIB, EL trip server 104, upon receiving the EL trip request, can confirm its ability to immediately and digitally make EL trip coverage available for the trip under the master policy and can immediately and digitally provide a certificate of coverage for the trip under the master policy. The carrier becomes a member of the RPG through the issuance of the certificate of coverage. The certificate of coverage can be delivered to the carrier and to anyone else designated by the carrier, such as the trucker and shipper. The certificate of coverage identifies, for example, the carrier, the WIB, the insurer, the RPG, the RIB, the BOL, the shipper, pick-up location and date, delivery location and date, coassignee, terms, and the date and the time of purchase.

Using the API, excess trip coverage can be obtained immediately for multiple trips in bulk, with confirmation and/or certification provided immediately and digitally for each trip. Request, confirmation (which can include payment, e.g., by shopping cart), and/or provision of a certificate of coverage can be performed simultaneously for multiple trips. EL trip coverage can be provided for single or multiple trips via a shipping system. Agreements can be pre-established that provide the shipping system with the authority to obtain the EL trip coverage on behalf of the truckers.

Figure 2:
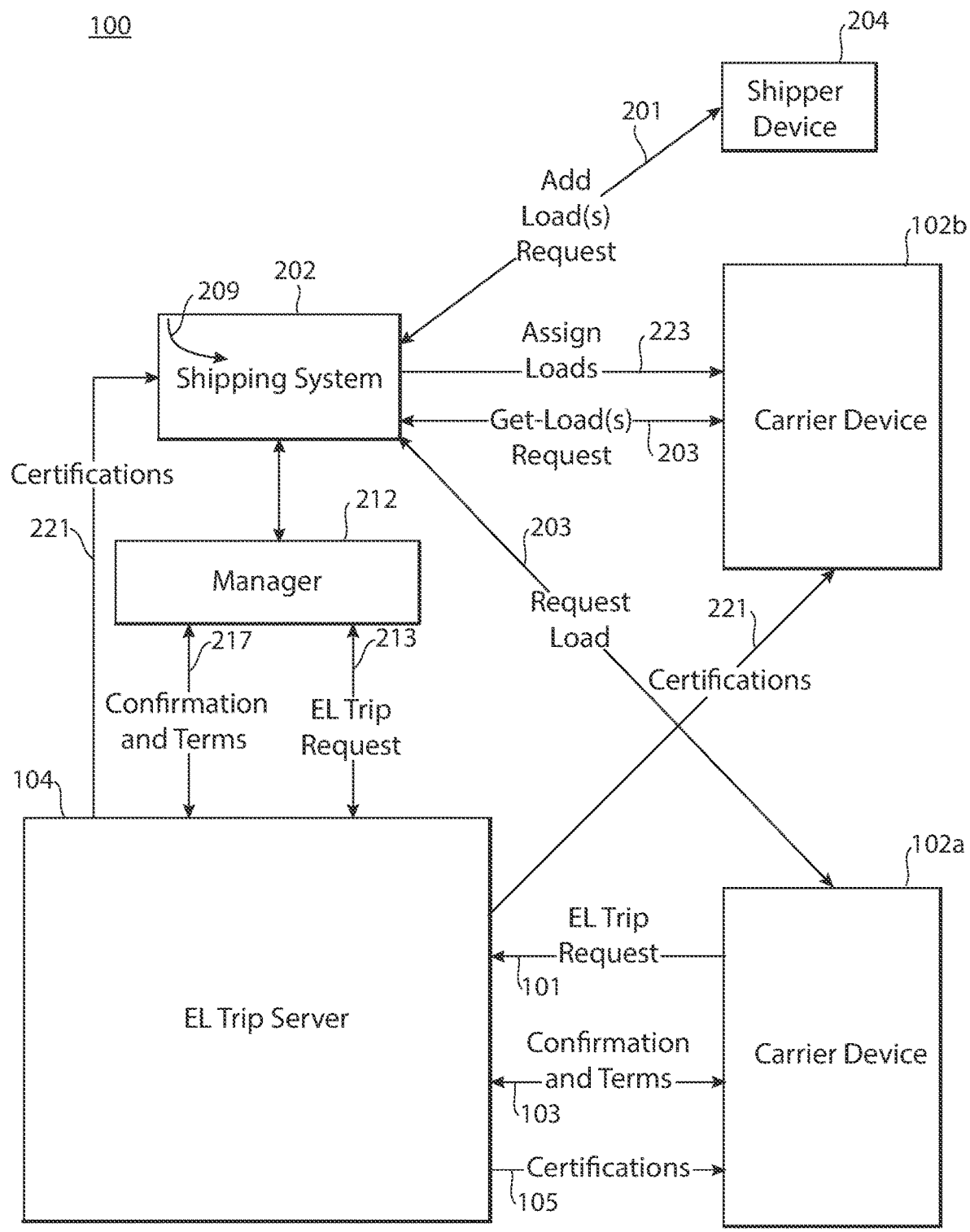
FIG. 2 is an example embodiment of the transportation support system shown in FIG. 1 when configured with a shipping system and mutual interfaces, in accordance with an aspect of the disclosure.

With reference to FIGS. 1-3, shown are block flow diagrams demonstrating implementation of the various exemplary embodiments. It is noted that the order of flows shown in FIGS. 1-3 is not required, so in principle, the various flows may be performed out of the illustrated order or in parallel. In addition, certain flows may be skipped, different flows may be added or substituted, or selected flows or groups of flows may be performed in a separate application following the embodiments described herein.

Language that refers to the exchange of information is not meant to be limiting. For example, the term "receive" as used herein refers to obtaining, getting, accessing, retrieving, reading, or getting a wired or wireless transmission. Use of any of these terms is not meant to exclude the other terms. Data that is exchanged between modules can be exchanged by a transmission between the modules, or can include one module storing the data in a location that can be accessed by the other module.

In FIG. 1, a user registers with EL trip server 104 prior to submitting any EL trip requests. Registration can include, for example, submission of official identification and entry of demographic information for each individual trucker of carrier or carrier fleet, the company by which they are employed to drive, and regulatory (DOT) certification, such as DOT certification.

For example, registration can require presentation of a valid DOT number indicative of DOT certification. A validation of the carrier can include using the DOT number to pull attributes associated with the DOT number from an acceptable information database, such as the Federal Motor Carrier Safety Administration (FMCSA) database. Only DOT numbers that have been in existence for at least a predetermined number of years may be deemed eligible to apply for the excess liability insurance. This requirement can be verified against official data, such as available at the Central Analysis Bureau and Federal Motor Carrier Safety Administration. When purchasing coverage, a user can be required to make representations as to the user's eligibility.

Once registered, a user can be authorized to login to use services by the EL trip server 104. Once logged in, a user can submit an EL trip request, represented as data flow 101, using an initial input screen (provided by the website, application, or API) displayed on client device 102. The user can use the initial input screen to enter trip information, including pick-up and delivery locations and an EL limit required. If the EL limit required is not entered, a default value can be used. The pick-up and delivery locations can each identify a city or a specific address. These locations define a coverage territory that refers to a travel route. The pick-up and delivery locations are consistent with a BOL associated with the load to be transported. Identification of the BOL can be provided with the EL trip request, either initially or when prompted. The user can be prompted by the EL server 104 via the input screen to enter additional information for the EL trip request. The coverage territory can be required to lie entirely within a designated region that can be specified by an insurer that provides the actual EL trip coverage. An example of a designated region is the United States of America including the District of Columbia. The EL trip coverage can be provided for travel in particular regions outside of the designated region per the insurer's rules, provided the coverage is purchased in accordance with requirements specified by the insurer. The insurer can specify particular regions, such as any of the United States' territories or possessions or bordering countries, to which EL trip coverage cannot or can be extended. For example, restrictions can be applied on a temporary basis, such as during a bad weather system to a particular region. In another example, EL trip coverage can be extended for a particular trip having a delivery location in Canada.

After inputting the pick-up and delivery locations, at flow 103 client device 102 can receive confirmation from EL trip server 104 that the EL trip coverage can be immediately and digitally provided. The confirmation can be an immediate and digital notification of confirmation. In one or more embodiments, the confirmation can include terms for purchasing the EL trip coverage. The terms can be based on a rating algorithm. Immediate provision of the confirmation can be on the order of seconds or without waiting time that is indiscernible to the user. Prior to or following provision of confirmation, the user can be prompted to provide further information that is used for insurance underwriting purposes, such as a valid DOT number, identification of a BOL for the trip, and estimated pick-up and delivery dates.

The rating algorithm provides the ability to rate single trips and multiple trips. The rating algorithm can determine the terms as a function of the pick-up and delivery locations and EL limit required, such as in terms of mileage. In one or more embodiments, the rating algorithm can use other information for determining the terms, such as the geolocation of the route, the pick-up and delivery dates of the trip, telematics, motor carrier safety record, route terrain, predicted or actual weather patterns, trucker demographic information, and/or trucker history. Other coverages can be combined with the EL trip coverage and taken into consideration for determining the term.

At flow 103, as indicated by the bi-directional arrow, the user can further be prompted to enter additional information and verify trip details, such as shipper and co-signee information and pick-up and delivery dates. Flow 103 can also include the user's acceptance of the terms. During or after flow 103, verification of information entered by the user can optionally be performed by comparing the information to the BOL. In addition, the insurer can perform random spot checks to verify that the user-entered information when applying for the insurance coverage is consistent with the BOL. In one or more embodiments, such spot checks can be performed even after the trip is concluded.

During or after flow 103, a reasonability check on the pickup and delivery dates relative to the miles to be traveled can optionally be performed. For example, in addition to calculating mileage, a minimum amount of travel time (days or hours) can be estimated for the trip and compared to the pick-up and delivery locations or the limit of requested EL trip coverage. The order of providing confirmation, prompting for additional information, and performing verification or reasonability checks can be configured in various configurations. Further, each of the processes for prompting for additional information, and performing verification or reasonability checks can be performed automatically (e.g., in accordance with the terms), including providing responses by client device 102 with information needed for execution of the processes.

At flow 105, once the EL trip coverage is obtained (e.g., by acceptance of the terms and/or online payment), a copy of a digital certificate of coverage is immediately provided as proof of EL trip coverage for the trip associated with the BOL.

The copy of the certificate of coverage can be provided digitally, such via email (e.g., in the body or as a downloadable document) or in condensed form via text message. In this way, transmission of the certificate of coverage suffices as actual delivery. The actual excess trip insurance is in effect upon this delivery, and (unless the excess trip insurance is terminated) claims can be filed for the trip described in the BOL based on the excess trip insurance.

The website, application, or API can be operated by a user to access a user profile and view recently issued certificates and/or cancel EL trip coverage, such as for upcoming trips. In accordance with insurer rules, the insurer can restrict cancellations to future trips. Upon cancellation, an issued certificate of coverage and the associated excess insurance are terminated.

The certificate of coverage is terminated upon the earliest of: goods identified in the BOL being delivered by the carrier to the delivery location identified in the BOL, a consignee identified in the BOL, or an agent of the consignee, otherwise taking possession of or refusing the goods, and cancellation or termination of the trip for another reason.

FIG. 2 shows a block flow diagram of transportation support system 100 with the addition of a shipping system 202. Shipping system 202 can include, for example, a freight broker, freight forwarder, or an entity employing third-party logistics that provides online services to shippers and carriers for matching loads that shippers need to have shipped to the respective carriers in order for a matched carrier to execute a trip by transporting the load based on instructions and requirements set by the shipper.

The assignment process can function, for example, as a bidding process in which each load that is added to a roster of the shipping system 202 is available to be matched to a carrier that can meet the requirements associated with the load by its shipper. The carriers and shippers can participate in the bidding process, such as by making offers and accepting the most desirable bid within a short period of time. In another scenario, the shipping system 202 can assign a first carrier that best meets the requirements to an available load. The shipping system 202 can set the format by which assignments are made, however these assignments can be made very quickly.

A carrier may lose out on opportunities for assignments if the carrier cannot immediately meet requirements associated with a load, such as EL trip coverage requirements. With the ability to immediately and digitally obtain EL trip coverage for a particular trip, a carrier that could not otherwise meet the EL trip requirements can now obtain required EL trip coverage or confirmation that EL trip coverage can immediately and digitally be obtained and be a candidate to be assigned to the load. With EL trip coverage being more affordable than EL annual coverage, carriers can compete with one another, regardless of their size or ability to afford an expensive EL annual coverage policy. Carriers that do not have EL annual coverage sufficient to cover load requirements and that are not registered with EL Trip Server for obtaining EL trip coverage can be blocked from participating in the assignment process.

EL trip coverage can be immediately and digitally obtained in coordination with the assignment process, such as by shipping system 202 submitting an EL trip request at flow 213 on behalf of a carrier that is not adequately covered by EL coverage. In another scenario, a carrier can submit the EL trip request at flow 101 in order to be able to participate in the assignment process.

Shipper device 204 is a computing device (e.g., desktop computer, server, tablet, laptop, smartphone) associated with a shipper. The shipper is an entity that needs loads delivered to a delivery destination. At flow 201, shipper device 204 sends a request to shipping system 202 to add one or more loads to shipping system 202's assignment system.

A manager 212 communicates with shipping system 202 to coordinate requesting and obtaining EL trip coverage with the shipping system 202's assignment process. Manager 212 acts as a liaison that coordinates the assignment process with EL trip server 104. Manager 212 can be integrated with shipping system 202, or can be a separate computing device that is coupled with or is remote from shipping system 202.

Authorization by the carriers to make agreements with EL trip server 104 and any other related entities (e.g., WIB, insurer, RIB, RPG member), shipping system 202, or manager 212 can be pre-established before the flows depicted are performed.

Flows 101, 103, and 105 exchanged between carrier device 102a and EL trip server 104 are in accordance with the description related to FIG. 1 and will not be repeated.

At flow 201, shipper device submits an add load(s) request to shipping system 202 to add one or more loads on behalf of a shipper. An add load request includes identification of the shipper, and trip information for transporting the load, such as identification of a BOL, or other means of identifying the load and the associated trip. The trip information includes pickup location and time for picking up the load, delivery location and time for delivering the load, and EL requirements. An internal shipping system (SS) ID can be assigned to the trip.

At flow 203, carrier device 102b submits a get-load(s) request to get assignments for one or more loads on behalf of a carrier for one or more truckers that work with the carrier. The get-load requests identifies its associated carrier and indicates an amount of original EL already associated with the carrier. The indication of the amount of original EL already associated with the carrier, e.g., the carrier's annual EL coverage, can be determined by manager 212 from information stored by the shipping system when the carrier registered with the shipping system 202. Accordingly, the identification of the associated carrier can suffice as the indication of the amount of original EL already associated with the carrier.

Shipping system 202 operates its assignment process. At internal flow 209, shipping system 202 tentatively assigns a carrier that submitted a get-load request to a load added via a get-load request in accordance with its assignment process.

In response to the tentative assignment, manager 212 determines whether the EL requirement for the trip is satisfied by the amount of original EL indicated for the carrier.

In response to a determination that the EL requirement for the trip is not satisfied, at flow 213 the manager 212 submits an EL trip request to EL trip server 104. The EL trip request includes identification of the carrier and the trip information for the trip. The EL trip request can include the SS ID. EL trip server 104 can prompt the manager 212 for additional information needed for the EL trip request. The EL trip request further requests immediate digital provision of EL trip coverage for the carrier in association with the trip so that the EL trip coverage will satisfy the trip's EL trip requirement. The amount of EL trip coverage needed can be determined based on any annual EL coverage already had by the carrier.

At flow 217, if EL trip server 104 determines that it can provide the requested EL trip coverage, EL trip server 104 transmits to manager 212 confirmation that the EL trip coverage can be immediately and digitally provided. The confirmation can include terms for obtaining the EL trip coverage. Prior to or following transmission of the confirmation, flow 217 can include a fast, automatic interactive process (as indicated by the bidirectional arrow) to obtain additional information from manager 212 as needed or to prepare certification of coverage or perform verification or reasonability as described above with respect to flow 103 of FIG. 1 (e.g., in accordance with the terms). When needed, manager 212 can prompt carrier device 102b to provide needed information. Obstacles to EL trip server 104 being able to provide the requested EL trip coverage include failure of the carrier device 102b to successfully register with EL trip server or an inability to obtain the additional information or pass the verification or reasonability checks.

Manager 212 further coordinates the assignment process with EL trip server 104 so that shipping system 202 only assigns the carrier to the trip after receiving confirmation that the requisite EL trip coverage needed to satisfy the trip's EL trip requirement can be immediately and digitally obtained. In response to failure to receive the confirmation that the requisite EL trip coverage can immediately and digitally be obtained, the get-load request can be blocked from participating in the assignment process for assignment to the trip. The get-load request can also be blocked for participating in the assignment process for other equivalent trips, meaning trips that have EL trip requirements that would not be met by the carrier due to its inability to obtain the confirmation.

In one or more embodiments, the EL trip server 104 further receives identification of a regulatory certification associated with the carrier, such as DOT certification, and identification of a bill of lading associated with the trip, wherein the confirmation that the EL trip coverage can immediately and digitally be obtained is based on receipt of the regulatory certificate and the EL trip coverage is based on the bill of lading.

EL trip server 104 can adjust the terms for obtaining the EL trip coverage for the trip, a future trip, or a previous trip as a function of actual or predicted trip execution data about execution of the trip.

The EL trip server 104 can take actions in response to the adjusted terms, such as changing a setting indicative of imminent revocation of the EL trip coverage pending satisfaction of the adjusted terms, a temporary or permanent ban for obtaining EL trip coverage for the carrier for the future trip, revocation of the EL trip coverage for the trip, and/or revocation of the EL trip coverage for a previous trip, The setting can be applied to data stored by the EL trip server 104 about the EL trip coverage requested and/or provided for one or more carriers.

The adjusted terms can be provided to the shipping system 202 or the carrier device 102 in a notification. The adjusted terms notification can be included with notification of a (new) confirmation for the corresponding trip, providing confirmation that EL trip coverage can immediately and digitally be obtained based on the adjusted terms. The notification of adjusted terms can be provided during, before, or after the trip (current trip, prior trip, or future trip) to which the adjusted terms apply.

At flow 221, once the EL trip coverage is obtained (e.g., by acceptance of the terms and/or online payment), EL server immediately provides copy of a digital certificate of coverage as proof of EL trip coverage for the trip associated with the BOL. The digital certificate can be provided by flow 221, for example, to the shipping system 202 and/or carrier device 102b. At flow 223, shipping system 202 sends an assignment of the load to the carrier device 102b to assign the trip for transporting the load to the carrier associated with carrier device 102b. The assignment of the load at flow 223 can include the SS ID.

Upon receiving the notification of the adjusted terms, the shipping system 202 or carrier device 102 can take actions, such as adjusting prioritization of an assignment scheme for assigning trips to carriers. In a shipping system's assignment scheme, carriers can be assigned a priority score that is used to prioritize assignments of trips to carriers. The assignment score can be a default value that is adjusted based on different factors, including adjustments of terms by the EL trip server 104. Depending on how the terms were adjusted, carriers that received adjusted terms for a previous trip may have their current priority score raised or lowered. Similarly, in a carrier's assignment scheme, truckers can be assigned a priority score that is used to prioritize assignments of trips to carriers. Depending on how the terms were adjusted, truckers that received adjusted terms for a previous trip may have their current priority score raised or lowered.

Figure 3A:
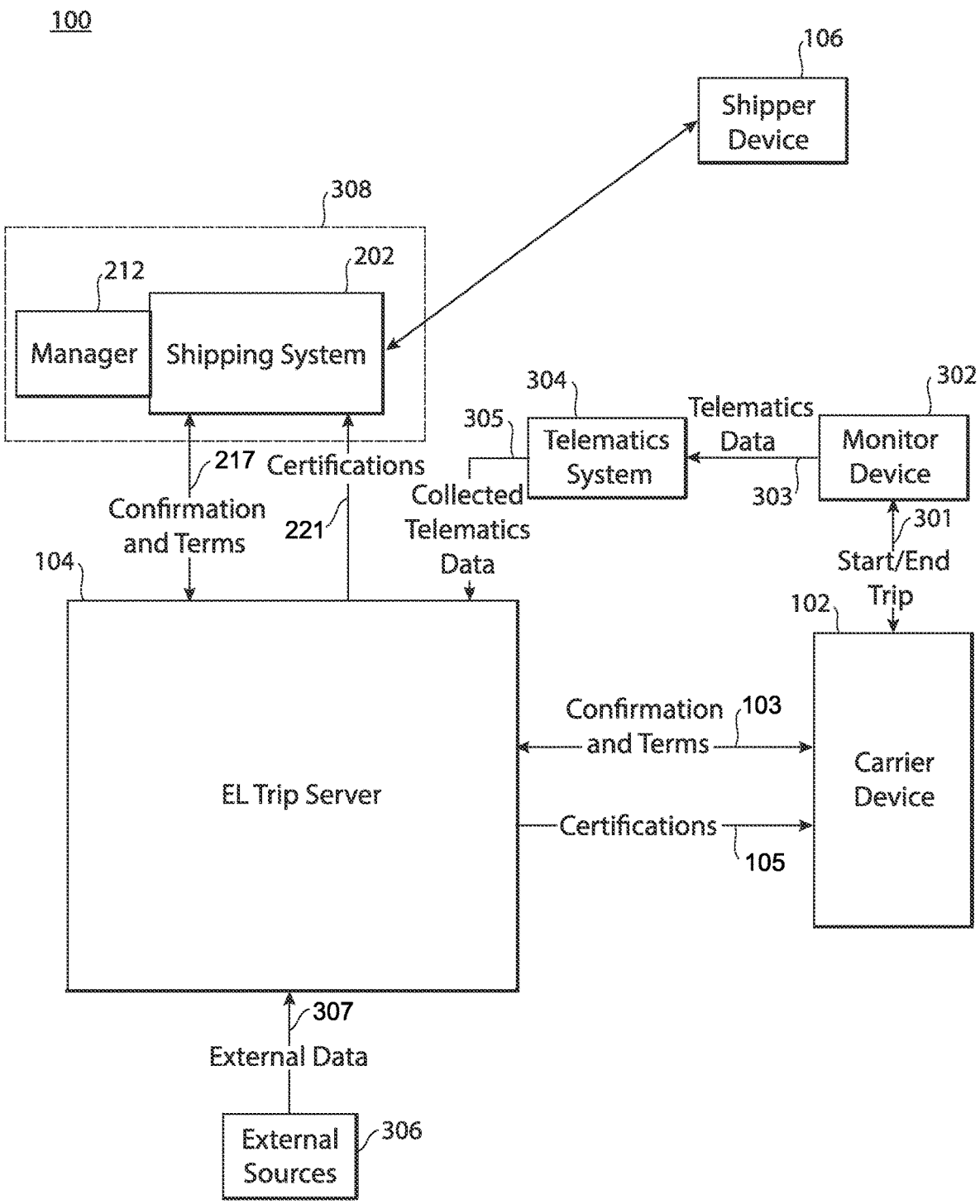
FIG. 3A is an example embodiment of the transportation support system shown in FIGS. 1 and 2 when configured with an ability to receive telematics data, in accordance with an aspect of the disclosure.

With reference to FIG. 3A, the actual or predicted trip execution data can include telematics data that can be monitored by a monitor device 302. The monitor 302 can report telematics data to a telematics system 304 at flow 303, or alternatively can report directly to EL trip server 104. The telematics system 304 can provide a service for collecting telematics data from multiple registered monitor devices 302, such as for multiple sensors or systems associated with one vehicle or for multiple vehicles. The collected telematics data is obtained by EL trip server 104 from telematics system 304 at flow 305. At flow 305, telematics system 304 can transmit the collected telematics data, such as in response to a request from EL trip server 104 or when a condition is satisfied, or EL trip server 104 can access stored collected telematics data.

The monitor device 304 can include, for example, integrated or external sensors that sense data about conditions associated carrier's vehicle and driver behavior, such as an on-board diagnostics (OBD) system or an onboard safety monitoring (OBSM) system. The sensors and/or systems can provide a continuous feed of streamed data or periodic measurements or analysis results, e.g., of vehicle condition, safety-related driving behaviors (e.g., speed, acceleration, and braking force), and report raw data, processed data and/or analysis results to telematics system 304.

In addition, external sources 306 can provide external data to EL trip server 104 at flow 307, wherein the external data is related to the trip, including historic, current, and/or predicted data. Some examples of external data sources 306 include an online map application (e.g., Google Maps™ or the like), department of transportation record services, department of transportation traffic rules, a weather application, and/or a source of demographic data providing demographics about the driver and/or comparing the demographics to pools of demographic information. Some examples of external data include data about driver demographics, carrier safety records, traffic rules per actual (e.g., based on global positioning system (GPS) coordinates) or expected geolocation of the carrier, terrain of the route, weather patterns, indications of driving behavior, and/or driver history. Some examples of indications of driving behavior include but are not limited to daily mileage driven, time of day at which driving is performed, evidence of hard braking, evidence of rapid acceleration, evidence of airbag deployment, evidence of speeding events or other noncompliance with traffic regulations, number of stops during a trip, and fuel efficiency, as related to the trip or previous trips.

FIG. 3A shows manager 212 and shipping system 202 integrated as a managed shipping system 308. When integrated, manager 212 and shipping system 202 can share one or more hardware or software components, and/or can be housed within a shared housing. In other embodiments, manager 212 and shipping system 202 can be remote systems that communicate via data communications, such as shown in FIG. 2.

FIG. 3A is not limited to a single carrier device 102. Further, carrier device 102 can be configured as carrier devices 102a or 102b shown in FIG. 2.

In one or more embodiments in which carrier device 102 is configured as carrier device 102a shown in FIG. 2, carrier device 102 sends an EL trip request to EL trip server 104 at flow 101 for a particular trip, as described with respect to FIG. 2. The EL trip request can include a carrier ID to identify the carrier and trip information about the trip. The trip information can include the trip's BOL ID, identification of the certification (certification ID), and/or pick-up and delivery locations and an EL limit required.

The carrier can begin the trip after receiving certifications at flow 105. In one or more embodiments, a carrier device 102 associated with the carrier sends a start trip notification at flow 301 to the monitor device 302 when it starts the trip at start trip 301. The start trip notification can be included in metadata and is timestamped. Monitor device 302 can continuously or intermittently sense, sample, measure, and/or collect data associated with the carrier and provide the data (continuously or periodically) to telematics system 304.

In one or more embodiments, the metadata includes ID of the carrier device. In one or more embodiments, the metadata provides trip information to identify the trip, such as the trip's BOL ID or pick-up and delivery locations. In one or more embodiments, the metadata is included with the telematics data sent via flow 303 the monitor device to the telematics system 304, and is included with the corresponding collected telematics data provided by the telematics system 304 to EL trip server 104 at flow 305.

In one or more embodiments in which carrier device 102 is configured as carrier device 102b shown in FIG. 2, as described with reference to FIG. 2, after assigning a particular trip to a carrier, trip manager 212 can send the SS ID and/or trip information (e.g., BOL ID) to the carrier device 102b at flow 221. The EL trip request can include a carrier ID to identify the carrier and trip information about the trip. The trip information can include, for example, the trip's BOL ID, identification of the certification (certification ID), and/or pick-up and delivery locations and an EL limit required.

As in the example above, the carrier can begin the trip after being assigned the trip at flow 223. In one or more embodiments, carrier device 102 associated with the assigned carrier may send a start trip notification with metadata at flow 301 to the monitor device 302 when it starts the trip at start trip 301. In one or more embodiments, the carrier will not send any notification or metadata to monitor device 302.

The EL trip server 104 receives the collected telematics data via flow 305. When metadata is available, EL trip server 104 uses the metadata associated with the collected telematics data to attribute the collected telematics data to the corresponding trip. For example, when the metadata includes the SS ID, BOL ID or certification ID, the EL trip server 104 can attribute the collected telematics data to the trip that corresponds to the SS ID, BOL ID or certification ID. When the metadata does not include SS ID, BOL ID or certification ID or metadata is not available, the EL trip server 104 can use the carrier ID and/or timestamp information associated with the collected telematics data to attribute the collected telematics data to a trip assigned to the identified carrier that has pick-up and delivery dates that correspond to all of the timestamps of the collected telematics data, e.g., the timestamps are included in a time interval defined by the pick-up and delivery dates.

In one or more embodiments, carrier device 102 (whether configured as carrier device 102a or 102b) can send an end trip notification at flow 301. Monitor device 302 can include metadata with telematics data that was obtained by monitor device 302 in between the start trip and end trip notifications, indicating the telematics data belongs to the trip.

Figure 3B:
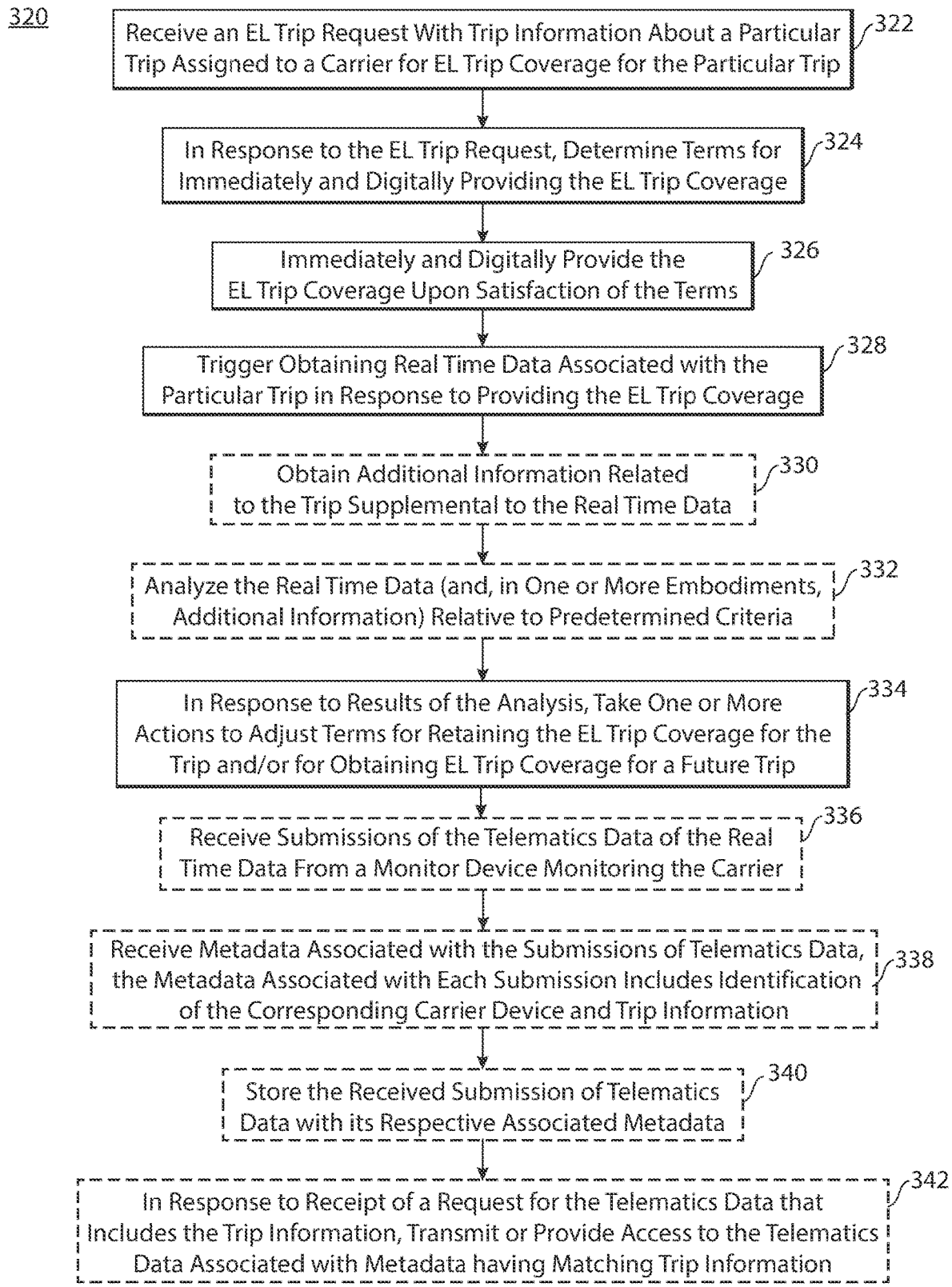
FIG. 3B shows an example method performed by the transportation support system shown in FIGS. 1-3, in accordance with an aspect of the disclosure.
Figure 3C:
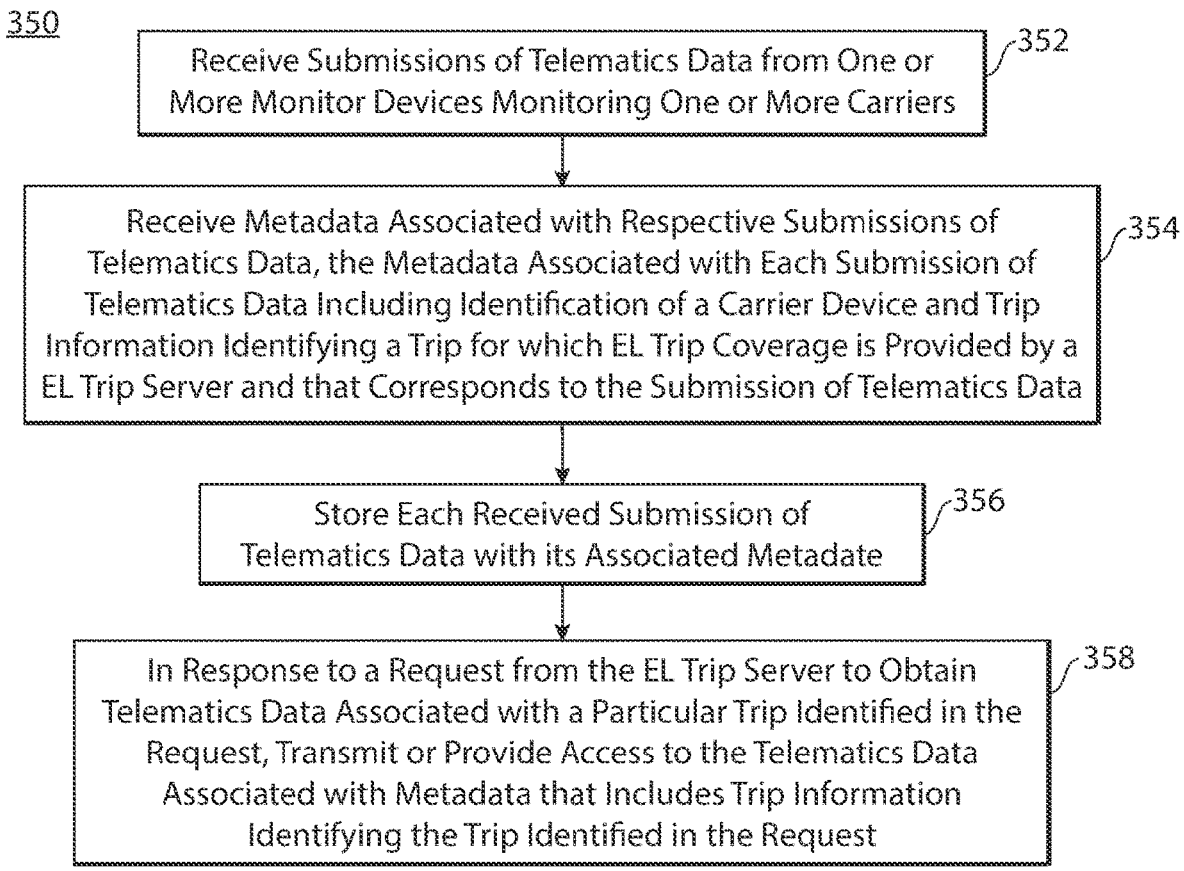
FIG. 3C shows an example method performed by a telematics system of the transportation support system shown in FIG. 3, in accordance with an aspect of the disclosure.
Figure 3D:
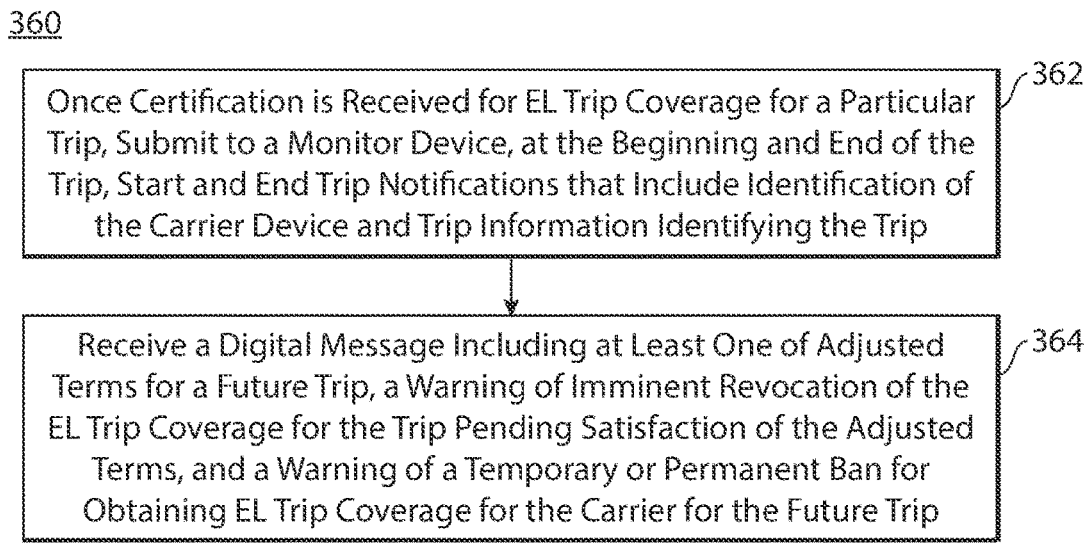
FIG. 3D shows an example method performed by a carrier of the transportation support system shown in FIGS. 1-3, in accordance with an aspect of the disclosure.

With reference now to FIGS. 3B-3D, shown are flowcharts demonstrating implementation of various exemplary embodiments of the disclosure. It is noted that the order of blocks shown in FIGS. 3B-3D is not required, so in principle, the various blocks may be performed out of the illustrated order or in parallel. Also certain blocks may be skipped, different blocks may be added or substituted, or selected blocks or groups of operations may be performed in a separate application following the embodiments described herein.

FIG. 3B illustrates blocks of a flowchart 320 that shows an example method performed by transportation support system, such as transportation support system shown in FIG. 1, in accordance with one or more embodiments of the disclosure. At block 322 an EL trip request is received with trip information about a particular trip assigned to a carrier for EL trip coverage for the trip. At block 324, in response to the EL trip request, terms are determined for immediately and digitally providing the EL trip coverage.

At block 326, the EL trip coverage is immediately and digitally provided upon satisfaction of the terms. At block 328, obtainment of real time data associated with the particular trip is triggered in response to providing the EL trip coverage. The real time data can include one or more of, without limitation, telematics data associated with conditions of the trip, condition of the carrier, and/or driving behavior during the trip, weather data associated with the time and location of the trip, information about trip hazards, compliance with traffic regulations during the trip, and terrain of the trip.

At block 330, in one or more embodiments, additional information related to the trip is obtained, wherein the additional information is supplemental to the real time data. This block is optional, as indicated by the dotted lines. The additional information can include one or more of, without limitation, history of condition of the carrier, predicted weather data associated with a time and geographical location of the trip, predicted information about trip hazards, information about traffic regulations associated with the geographical location of the trip, history of compliance by the carrier or driver with the traffic regulations, predicted terrain of the trip, history of driving behavior, and a driving record associated with a driver of the carrier.

Obtaining the telematics data can include at least one of sending a request for telematics data associated with the trip to a telematics system collecting the telematics data for one or more trips from one or more monitors, accessing the telematics data associated with the trip from storage of the telematics system, and obtaining the telematics data associated with the trip from a third party that obtained the telematics data associated with the trip from the telematics system.

At block 332, in one or more embodiments, the real time data (and/or, in one or more embodiments, additional information) is analyzed relative to predetermined criteria. This block is optional, as indicated by the dotted lines.

At block 334, in response to results of the analysis, one or more actions are taken to adjust terms for retaining the EL trip coverage for the trip and/or for obtaining EL trip coverage for a future trip. In one or more embodiments, the one or more actions can include, without limitation to the examples described, obtaining and/or requesting additional real time data or more detailed real time for the trip and/or the future trip, changing a setting indicative of imminent revocation of the EL trip coverage pending satisfaction of the adjusted terms, a temporary or permanent ban for obtaining EL trip coverage for the carrier for the future trip, revocation of the EL trip coverage for the trip, and/or revocation of the EL trip coverage for a previous trip, sending a digital message warning of imminent revocation of the EL trip coverage pending satisfaction of the adjusted terms, sending a digital message of the adjusted terms for the future trip, and/or revoking EL trip coverage for a previous trip by the carrier.

At block 336, in one or more embodiments, submissions of the telematics data of the real time data are received from a monitor device monitoring the carrier. At block 338, in one or more embodiments, metadata associated with the submissions of telematics data is received. The metadata associated with the submission of telematics data includes identification of the carrier device and the trip information. At block 340, in one or more embodiments, the received submission of telematics data is stored with its associated metadata. At block 342, in one or more embodiments, in response to receipt of a request for the telematics data that includes the trip information, the telematics data associated with metadata having the trip information is transmitted or made accessible. Blocks 336-342 are optional, as indicated by the dotted lines.

FIG. 3C illustrates blocks of a flowchart 350 that shows an example method performed by telematics system of a transportation support system, such as telematics system 304 shown in FIG. 3A, in accordance with one or more embodiments of the disclosure. At block 352 submissions of telematics data are received from one or more monitor devices monitoring one or more carriers. At block 354, metadata associated with respective submissions of telematics data is received. The metadata associated with each submission of telematics data includes identification of a carrier device and trip information identifying a trip for which EL trip coverage is provided by an EL trip server and that corresponds to the submission of telematics data.

At block 356, each received submission of telematics data is stored with its associated metadata. At block 358, in response to a request from the EL trip server to obtain telematics data associated with a particular trip identified in the request, the telematics data associated with metadata that includes trip information identifying the trip identified in the request is transmit or access to the telematics data is provided.

FIG. 3D illustrates blocks of a flowchart 360 that shows an example method performed by a carrier device of a transportation support system, such as carrier device 102 shown in FIGS. 1 and 3A and carrier devices 102a and 102b shown in FIG. 3A, in accordance with one or more embodiments of the disclosure. At block 362, once certification is received for EL trip coverage for a particular trip, at the beginning and end of the trip, start and end trip notifications are submitted to a monitor device. The start and end notifications include identification of the carrier device and trip information identifying the trip.

At block 364, a digital message is received that includes at least one of adjusted terms for a future trip, a warning of imminent revocation of the EL trip coverage for the trip pending satisfaction of the adjusted terms, and a warning of a temporary or permanent ban for obtaining EL trip coverage for the carrier for the future trip.

With reference now to FIG. 4, an example screenshot 400 of a graphical user interface (GUI) is shown. The GUI can be used to display information to the user and to accept user input. Screenshot 400 shows a shopping cart feature that allows a user, such as an administrator of shipping system 202, to book multiple trips and pay for them individually or all at once using a spreadsheet based utility tool. Using the spreadsheet tool, EL trip coverage can be requested for individual trips or in bulk. This can include using a pre-established payment plan that can include periodic billing, e.g., for select customers.

The user can access their profile by logging in to the API, after which the user can request EL trip coverage for single or multiple trips by entering trip details into cells of the spreadsheet displayed. Each row can refer to an individual trip. The trip details for each trip can be entered as specified for each column (e.g., origin city, origin state, and origin zip (where the load is to be picked up), destination city, destination state, and destination zip (where the load is to be delivered)). If booking multiple trips, a user can enter this information for each of the trips, e.g., use a block of cells e.g., in each of rows 1-11, or for up to a maximum number of trips allowed.

After validating that all the information is correctly entered, the user can request confirmation that EL trip coverage can be immediately and digitally obtained for selected trips displayed, including terms for the selected trips, such as clicking on a "confirm trip(s)" button 402.

With reference to FIG. 5, after confirmation with terms is requested, those trips for which the user input information was entered correctly can be designated in column 1204 as being "confirmed." The designation for confirmed can be a graphical indicator applied to a field (e.g., a checkbox), such as by applying a color (e.g., yellow), shading, etc. Any trips for which the information was input incorrectly, the field in column 404 can be designated as being unconfirmed or "rejected." The designation for "rejected" can be a graphical indicator applied to the field, such as by applying a color (e.g., red), shading, etc. The user can choose to either fix the information for the trips indicated as rejected or continue. If the user chooses to fix information, the user can then select "confirm trip(s)" button 402 once the appropriate information is entered.

Once the user input information is accepted, terms for the request, identified by a request ID, can be obtained. EL trip coverage can be requested for all the accepted trips entered in the spreadsheet by selecting "Select All," such as by clicking on tool 406, to check all the boxes. Otherwise, the user can select trips individually, such as by clicking on the selected trips.

With reference to FIG. 6, after the user has checked all the accepted trips for which EL trip coverage is requested, the user can input additional information requested by EL trip server 104 into specified cells 408 for multiple trips. Examples of additional information requested by EL trip server 104 include DOT number, pick-up date, delivery date, BOL identification (ID), shipper name, and consignee name.

Once all the trip details are entered, and the user has selected the trips for EL coverage is selected to be obtained, the user can initiate a transaction to purchase the EL trip coverage, such as by clicking on "Buy Selected Trip(s)," such as by clicking on tool 410.

Figure 7:
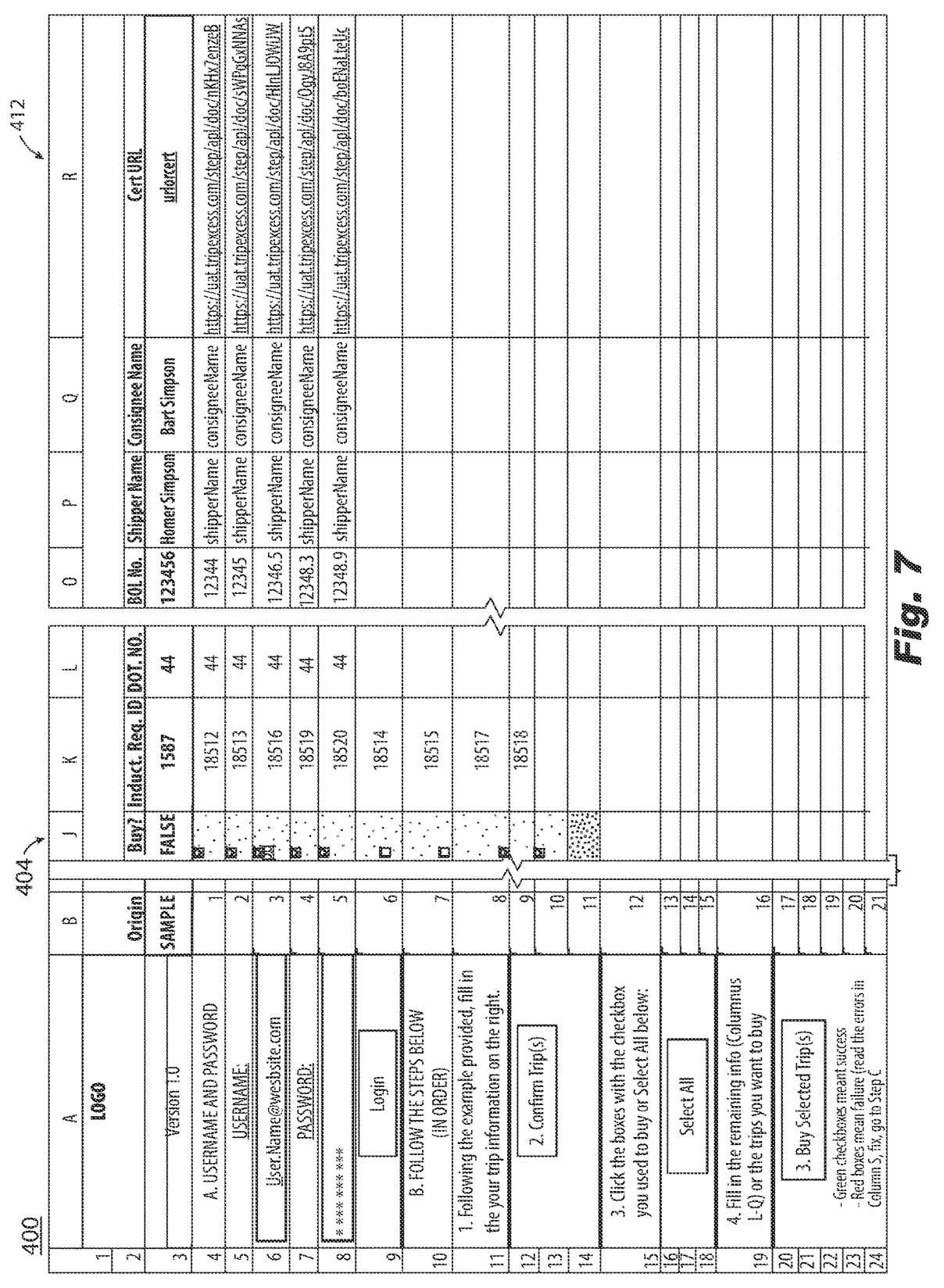

With reference to FIG. 7, the trips for which EL trip coverage has been purchased can then be indicated in the corresponding fields in column 404 designated as "purchased." The designation for purchased can be a graphical indicator applied to the field, such as by applying a color (e.g., green), shading, etc. Column 412 provides a URL via which a certificate for the purchased coverage can be digitally accessed. In addition, a confirmation email can be sent to an email address associated with the user with links to certificates for each of the purchased trips. Those trips for which coverage could not be purchased due to an error(s) can be designated as still rejected in column 1204, and therefore not purchased. The user can choose to fix any errors associated with the trips designated as being rejected. Any trip entries not selected for purchase can remain designated as confirmed.

Selected trip entries can be removed before requesting confirmation or making a transaction. Trips can be selected, such as by using a click and drag tool to highlight the trips. The user can clear the selected terms provided, such as by using a tool (not shown) to clear trip confirmations. In addition, the user can clear all of the trips and the related information by using a "Clear All Trips" (not shown).

Application Programming Interface (API) Integration

The API can be a published API that allows a shipping system the ability to integrate their third party logistics systems (a.k.a., TPL or 3PL systems) with the services provided by EL trip server 104. Third-party logistics providers typically specialize in integrated operations of warehousing and transportation services that can be scaled and customized to customers' needs, based on market conditions, and to meet the demands and delivery service requirements for their products. Often, services exceed logistics to include value-added services related to the production or procurement of goods, such as services that integrate parts of the supply chain. A provider of such integrated services is referenced as a third-party supply chain management provider (3PSCM), or as a supply chain management service provider (SCMSP). 3PL targets particular function within supply management, such as warehousing, transportation, or raw material provision.

Shipping system 202 and/or EL trip server 104 can be embedded within a 3PL system and can be triggered when a load requiring excess coverage is paired with a carrier who does not have EL trip coverage. For example, the shipping system 202 can be triggered to request EL trip coverage. The EL trip coverage can be confirmed on demand, and obtained immediately followed by immediate provision of a digital certificate of the EL trip coverage. The ability to obtain the EL trip coverage immediately and digitally on demand can foster competition between large and small carriers, because it allows smaller carriers into a space that has to date been dominated by large carriers. This can benefit the marketplace and foster a healthy competitive market that may continue to grow in coming years as the cost of goods may naturally increase.

In addition, once the EL trip coverage is obtained, the EL trip server can be triggered to obtain real time data about the trip once the EL trip coverage is provided, such as for analyzing the real time data relative to predetermined criteria. In response to results of the analysis, the EL trip server can take one or more actions to adjust terms for retaining the EL trip coverage for the trip and/or for obtaining EL trip coverage for a future trip. This provides immediate consequences or awards for driving behavior, driving conditions, carrier condition, etc.

The API thus enables shipping system 202 to procure EL trip coverages through its interaction with EL trip server 104. Shipping system 202 can tentatively assign a load to a carrier, and only assign the load to the carrier upon determining if EL trip coverage is needed, and automatically request confirmation of the immediate and digital EL trip coverage requested. The shipping system can integrate with the API to provide data elements needed by the API, such as the pick-up city, delivery city, DOT number, BOL ID, pick-up date, delivery date, etc. The API can return the confirmation to shipping system 202. Via the API, a link can be provided to the certificate of coverage once a transaction is confirmed.

Aspects of the present disclosure are described above with reference to flow diagrams illustrations and/or block diagrams of methods, apparatus (systems) and computer program products according to embodiments of the disclosure. It will be understood that each flow of the flow diagram illustrations and/or block diagrams, and combinations of flows in the flow diagram illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the client device 102, EL trip server 104, shipping system 202, shipper device 204, manager 212, monitor device 302, and/or telematics system 304 may be implemented or executed by one or more computer systems. For example, client device 102, EL trip server 104, shipping system 202, shipper device 204, manager 212, monitor device 302, and/or telematics system 304 can be implemented using a computer system such as example computer system 800 illustrated in FIG. 8. In various embodiments, computer system 800 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 800 is only one example of a suitable system and is not intended to suggest any limitation as to the scope of use or functionality of embodiments of the disclosure described herein. Regardless, computer system 800 is capable of being implemented and/or performing any of the functionality set forth hereinabove.

Computer system 800 may be described in the general context of computer system-executable instructions, such as program modules, being executed by a computer system. Generally, program modules may include routines, programs, objects, components, logic, data structures, and so on that perform particular tasks or implement particular abstract data types. Computer system 800 may be practiced in distributed data processing environments where tasks are performed by remote processing devices that are linked through a communications network. In a distributed data processing environment, program modules may be located in both local and remote computer system storage media including memory storage devices.

Figure 8:
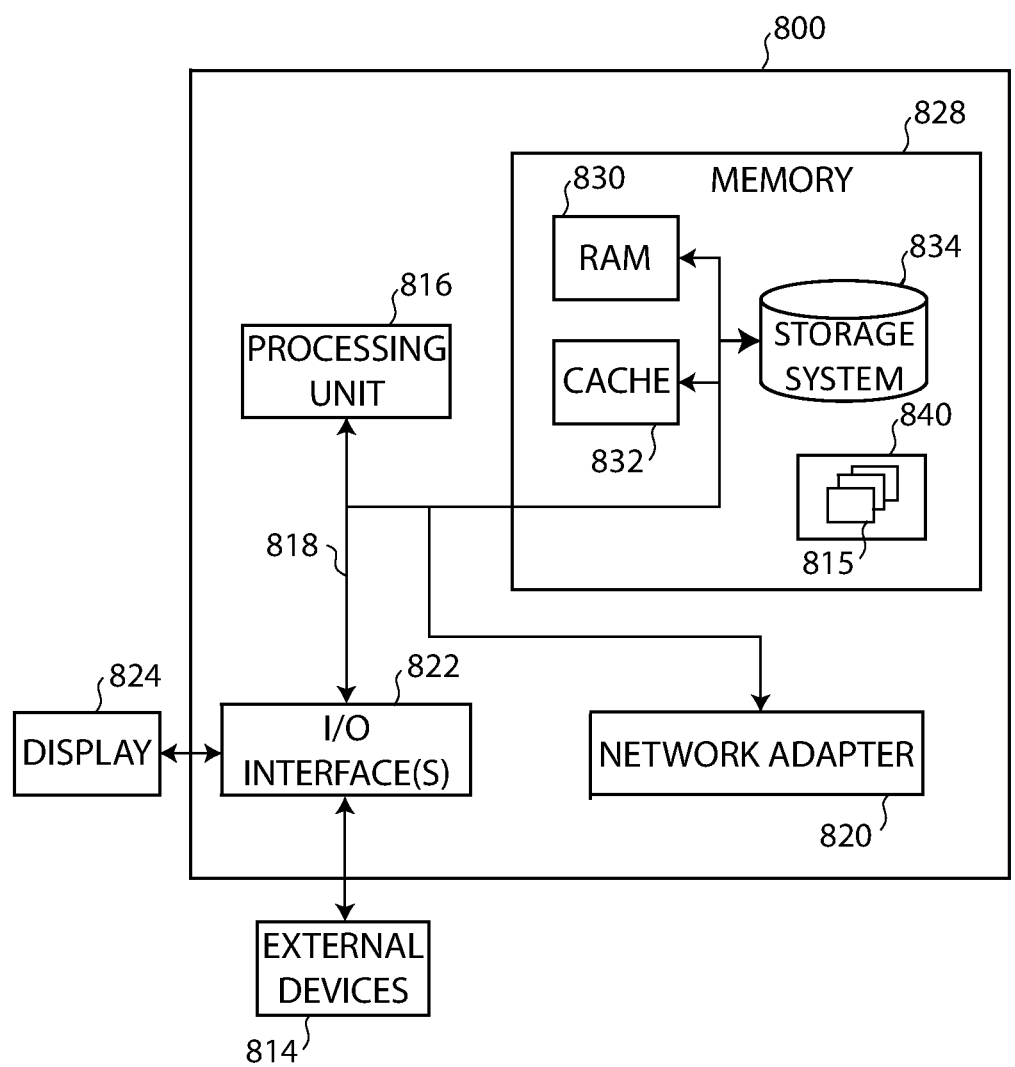
FIG. 8 illustrates an example computing system that could be used to implement a client device, EL trip server, shipping system, shipper device, manager, monitor device, and/or telematics system shown in FIGS. 1-3.

Computer system 800 is shown in FIG. 8 in the form of a general-purpose computing device. The components of computer system 800 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 800 typically includes a variety of computer system readable media. Such media may be any available media that is accessible by computer system 800, and it includes both volatile and non-volatile media, removable and non-removable media.

System memory 828 can include computer system readable media in the form of volatile memory, such as random access memory (RAM) 830 and/or cache memory 832. Computer system 800 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the disclosure.

Program/utility 840, having a set (at least one) of program modules 815, such as computer system 800, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 815 generally carry out the functions and/or methodologies of embodiments of the disclosure as described herein.

Computer system 800 may also communicate with one or more external devices 814 such as a keyboard, a pointing device, a display 824, etc.; one or more devices that enable a user to interact with computer system 800; and/or any devices (e.g., network card, modem, etc.) that enable client device 102, EL trip server 104, shipping system 202, shipper device 204, manager 212, monitor device 302, and/or telematics system 304 8 to communicate with one or more other computing devices. Such communication can occur via Input/Output (I/O) interfaces 822. Still yet, computer system 800 can communicate with one or more networks such as a local area network (LAN), a general wide area network (WAN), and/or a public network (e.g., the Internet) via network adapter 820. As depicted, network adapter 820 communicates with the other components of network system 80 via bus 818. It should be understood that although not shown, other hardware and/or software components could be used in conjunction with computer system 800. Examples, include, but are not limited to microcode, device truckers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the transportation support system include enablement of immediate and digital confirmation provision of EL trip coverage for a particular trip, automated processes for restricting assignment of trips to carriers to carriers that are determined to be candidates for obtaining the EL trip coverage, automatically determining and/or adjusting terms for obtaining the EL trip coverage, using real time data, (which in one or more embodiments includes telematics data) about the trip to update terms for the current, future, or past trips. The transportation support system can be scaled to accommodate additional components. For example, one or more EL trip servers can operate with an expandable number of shipping systems, an expandable number of carriers (directly or via shipping systems), and an expandable number of telemetric systems.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A manager system for automatically managing a shipping system, the manager system comprising:
 a memory configured to store a plurality of programmable instructions; and
 a processing device in communication with the memory, wherein the programmable instructions when executed by the processing device, cause the processing device to:
  receive via computer network communication trip information for a plurality of trips requested by at least one shipper, the trip information indicating an excess liability (EL) trip requirement for the trip and a source/destination location pair for transport of the load;
  receive via computer network communication get-load requests associated with a plurality of carriers to participate in an assignment process to be assigned to a trip of the plurality of trips for executing the trip, wherein each get-load request identifies its associated carrier and indicates an amount of original EL already associated with the carrier;
  tentatively assign by an assignment process a carrier identified by one of the get-load requests to a trip of the plurality of trips;
  in response to the tentative assignment, determine whether the EL requirement for the trip is satisfied by the amount of original EL indicated for the carrier;
  in response to a determination that the EL requirement for the trip is not satisfied, submit via computer network communication an EL trip request, the EL trip request including identification of the carrier, including the trip information for the trip, and requesting immediate digital provision of EL trip coverage for the carrier in association with the trip that satisfies the trip's EL trip requirement;
  receive via computer network communication a confirmation signal, if provided, that indicates the EL trip coverage is to be immediately and digitally be obtained;
  responsive to receipt or non-receipt of the confirmation signal:
   only assign by the assignment process the carrier to the trip after receiving the confirmation signal; and
   in response to failure to receive the confirmation signal, block the get-load request associated with the carrier from participating in the assignment process and/or a second assignment process to be assigned to other equivalent trips of the plurality of trips.

2. The manager system of claim 1, wherein the programmable instructions when executed by the processing device, further cause the processing device to receive via computer network communication identification of a regulatory certification associated with the carrier and identification of a bill of lading associated with the trip, wherein receipt of the confirmation signal is based on receipt of the regulatory certificate and the EL trip coverage is based on the bill of lading.

3. The manager system of claim 1, wherein the confirmation signal includes first terms for obtaining the EL trip coverage, wherein the programmable instructions when executed by the processing device further cause the processing device to receive via computer network communication a second confirmation signal indicating that EL trip coverage is to be immediately and digitally be obtained in association with the carrier and a second trip, wherein the second confirmation signal includes second terms that were adjusted relative to the first terms as a function of actual or predicted trip execution data about execution of the trip, wherein the second trip is one of the trip causing the trip, a future trip, or a previous trip, and wherein the programmable instructions, when executed by the processing device, further cause the processing device to use the second terms to adjust a priority score associated with the carrier for use by the assignment process for assigning the carrier to the second trip.

4. The manager system of claim 3, wherein the actual or predicted trip execution data is received via computer network communication and includes telemetric data, comparison results of the logged or streamed telemetric data relative to traffic rules or laws, geolocation of a predicted or actual route of the trip, indications of driving behavior, and/or weather data describing predicted or actual weather associated with the trip.

5. The manager of system of claim 3, wherein the programmable instructions when executed by the processing device, further cause the processing device to receive via computer network communication notification of the second terms before, future trip.

6. A trip excess liability (EL) server, the trip EL server comprising:

a memory configured to store a plurality of programmable instructions; and a processing device in communication with the memory, wherein the programmable instructions when executed by the processing device, cause the processing device to:

receive via computer network communication an EL trip request from a manager system of a shipping system, wherein the EL trip request is triggered in response to receipt of a get-load request from a carrier tentatively assigned by an assignment process to a trip by the manager system, the get-load request requesting assignment to a plurality of trips, the EL request including identification of the carrier and including trip information for the trip, wherein the trip information indicates an EL trip requirement for the trip and a source/destination location pair for transport of the load, the EL trip request requesting immediate digital provision of EL trip coverage for the carrier in association with the trip that satisfies the trip's EL trip requirement;

determine first terms of the EL trip coverage based on the trip information in view of an amount of original EL already associated with the carrier; and control the assignment process for assigning the carrier to the trip by providing via computer network communication or not providing a confirmation signal to the manager system, wherein the confirmation signal indicates the determined EL trip coverage is to be immediately and digitally provided for the trip in accordance with the first terms, wherein the carrier is assigned to the trip by the assignment process in response to provision of the confirmation signal, and the get-load request is blocked from participating in the assignment process and/or a second assignment process to be assigned to other equivalent trips of the plurality of trips in response to non-provision of the confirmation signal.

7. The EL server of claim 6, wherein provision of the confirmation signal is dependent on receiving via computer network communication identification of a regulatory certificate associated with the carrier and identification of a bill of lading and the EL trip coverage is based on the bill of lading.

8. The EL server of claim 6, wherein the programmable instructions when executed by the processing device, further cause the processing device to:

receive via computer network communication actual or predicted trip execution data about execution of the trip;

adjust second terms relative to the first terms as a function of the trip execution data;

include the second terms with a second confirmation signal that indicates the determined EL trip coverage is to be immediately and digitally provided for a second trip, the second trip being the trip, a past trip or a future trip; and provide via computer network communication, in association with the second trip, the second confirmation signal to the manager system, wherein the second terms cause adjustment of a priority score that is associated with the carrier for use by the assignment process for assigning the carrier to the second trip.

9. The EL server of claim 8, wherein the actual or predicted execution data is received via computer network communication and includes logged or streamed telemetric data, comparison results of the logged or streamed telemetric data relative to traffic rules or laws, geolocation of a predicted or actual route of the trip, indications of driving behavior, and/or weather data describing predicted or actual weather associated with the trip.

10. The EL server of claim 8, wherein the programmable instructions when executed by the processing device, further cause the processing device to transmit notification via computer network communication of the second terms before, during, or after the future trip.

11. A computing device comprising:

a memory configured to store a plurality of programmable instructions; and a processing device in communication with the memory, wherein the programmable instructions when executed by the processing device, cause the processing device to:

submit via computer network communication a get-load request to a manager system of a shipping system to participate in an assignment process managed by the manager system, the get-load request requesting assignment to a trip of a plurality of trips for execution of the trip by a carrier associated with the get-load request, the get-load request identifying the carrier and indicating an amount of original excess liability (EL) already associated with the carrier;

wait for receipt via computer network communication of notification of an assignment by an assignment process of the manager system of the carrier to a trip of the plurality of trips, wherein the trip is only tentatively assigned by the assignment process when the amount of original EL indicated in the get-load request does not satisfy an EL requirement for the trip and the notification of assignment is only provided by the assignment process after an EL trip request is submited via computer network communication to an EL server in response to receipt of the get-load request, the EL trip request including identification of the carrier and a source/destination location pair for transport of a load for the trip and requesting a confirmation signal via computer network communication that indicates EL trip coverage for the carrier in association with the trip that satisfies the trip's EL trip requirement is to be immediately and digitally provided, wherein further participation of the get-load request in the assignment process and/or a second assignment process for assignment to other equivalent trips of the plurality of trips is controlled by receipt or non-receipt via computer network communication of the confirmation signal; and receive via computer network communication the notification of the assignment in response to the manager system receiving the confirmation signal, wherein the get-load request is blocked from further participation in the first and/or second assignment processes in response to non-receipt by the manager system of the confirmation signal.

12. The computing device of claim 11, wherein the programmable instructions when executed by the processing device, further cause the processing device to digitally and immediately obtain the EL trip coverage from the EL server and/or the manager system.

13. The computing device of claim 12, wherein the EL trip request further includes providing identification of a regulatory certificate associated with the carrier and identification of a bill of lading associated with the trip, wherein immediately and digitally obtaining the EL trip coverage is based on provision of the regulatory certificate and the EL trip coverage is based on the bill of lading.

14. The computing device of claim 11, wherein the confirmation signal includes first terms for obtaining the EL trip coverage, wherein actual or predicted trip execution data about execution of the trip is provided to the EL server causing the EL server to adjust second terms relative to the first terms as a function of the trip execution data and include the second terms with a second confirmation signal provided via computer network communication that indicates that EL trip coverage is to be immediately and digitally obtained for a second trip, the second trip being the trip, a past trip or a future trip and the second terms cause adjustment of a priority score that is associated with the carrier for use by the assignment process for assigning the carrier to the second trip, and wherein the programmable instructions, when executed by the processing device, further cause the processing device to receive via computer network communication notification of the second terms.

15. The computing device of claim 14, wherein the actual or predicted execution data is received via computer network communication and includes logged or streamed telemetric data, comparison results of the logged or streamed telemetric data relative to traffic rules or laws, geolocation of a predicted or actual route of the trip, indications of driving behavior, and/or weather data describing predicted or actual weather associated with the trip.

16. The computing device of claim 14, wherein the notification of the second terms is received before, during, or after the second trip.

\* \* \* \* \*